United States Patent
Jo et al.

(10) Patent No.: US 8,755,198 B2
(45) Date of Patent: Jun. 17, 2014

(54) MODULAR CONTROL AND DRIVING DEVICE AND HIGH VOLTAGE POWER SUPPLY HAVING THE SAME FOR IMAGE FORMING APPARATUS

(75) Inventors: Sung-jo Jo, Suwon-si (KR); Jong-hwa Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 768 days.

(21) Appl. No.: 12/494,609

(22) Filed: Jun. 30, 2009

(65) Prior Publication Data
US 2010/0008116 A1    Jan. 14, 2010

(30) Foreign Application Priority Data
Jul. 14, 2008 (KR) .................. 10-2008-0068350

(51) Int. Cl.
*H02M 3/28* (2006.01)
(52) U.S. Cl.
USPC .................. 363/15; 363/65; 363/147
(58) Field of Classification Search
USPC .................. 363/15, 16, 39–41, 65–71, 147
See application file for complete search history.

(56) References Cited

U.S. PATENT DOCUMENTS

| | | | | |
|---|---|---|---|---|
| 3,721,890 A * | 3/1973 | Ettinger et al. | ............... | 363/144 |
| 6,014,322 A * | 1/2000 | Higashi et al. | ............... | 363/65 |
| 7,187,565 B2 * | 3/2007 | Chae | ............... | 363/69 |
| 7,253,387 B2 * | 8/2007 | Archer et al. | ............... | 250/207 |
| 7,297,955 B2 * | 11/2007 | Amemiya et al. | ....... | 250/363.05 |
| 7,706,122 B2 | 4/2010 | Chae et al. | | |
| 7,791,907 B2 * | 9/2010 | Cho et al. | ............... | 363/21.01 |
| 2004/0196488 A1 * | 10/2004 | Tanaka et al. | ............... | 358/1.14 |
| 2006/0176717 A1 * | 8/2006 | Chae et al. | ............... | 363/41 |

FOREIGN PATENT DOCUMENTS

| | | |
|---|---|---|
| CN | 1832314 | 9/2006 |
| KR | 1019990014557 | 2/1999 |
| KR | 1020060088774 | 8/2006 |
| KR | 1020080014410 | 2/2008 |

OTHER PUBLICATIONS

Korean Office action Issued on Jul. 24, 2012 in KR Patent Application No. 10-2008-0068350.
Office Action issued in Chinese Application No. 200910152276.0 dated Feb. 8, 2013.
Office Action issued in Chinese Application No. 200910152276.0 on Nov. 14, 2013.

* cited by examiner

*Primary Examiner* — Jessica Han
(74) *Attorney, Agent, or Firm* — Stanzione & Kim, LLP (57) ABSTRACT

A control and driving device of a high voltage power supply (HVPS) of an electronic apparatus, such as an image forming apparatus, including an input to receive a signal supplied to the HVPS, a control and driving circuit to control and drive the signal received at the input, and an output to output the controlled and driven signal to a transformer of the HVPS, wherein the input, control and driving circuit, and output are integrated into one physical module.

21 Claims, 5 Drawing Sheets

FIG. 6

MODULAR CONTROL AND DRIVING DEVICE AND HIGH VOLTAGE POWER SUPPLY HAVING THE SAME FOR IMAGE FORMING APPARATUS

CROSS-REFERENCE TO RELATED APPLICATIONS

This application claims the benefit of Korean Patent Application No. 10-2008-0068350, filed on Jul. 14, 2008, in the Korean Intellectual Property Office, the disclosure of which is incorporated herein in its entirety by reference.

BACKGROUND

1. Field of the Invention

The present general inventive concept relates to a power supply, and, more particularly, to a modular control and driving device and a high voltage power supply (HVPS) having the same which may be used with an image forming apparatus.

2. Description of the Related Art

Figure 1A:
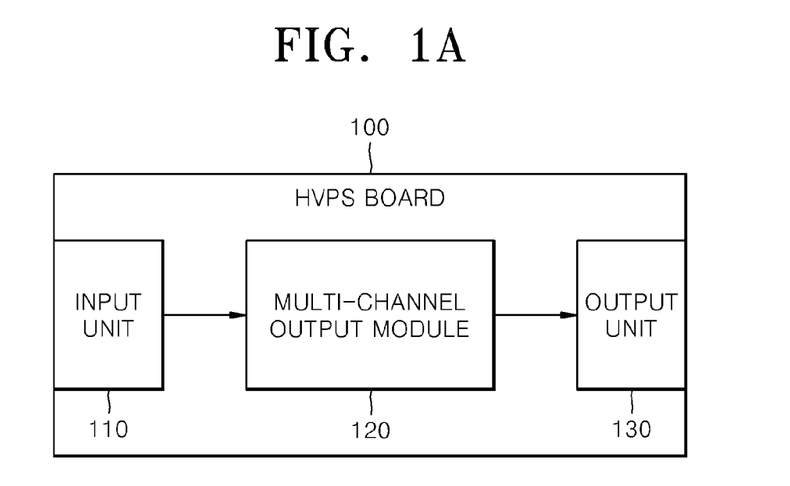
FIG. 1A is a block diagram illustrating a conventional high voltage power supply (HVPS)
Figure 1B:
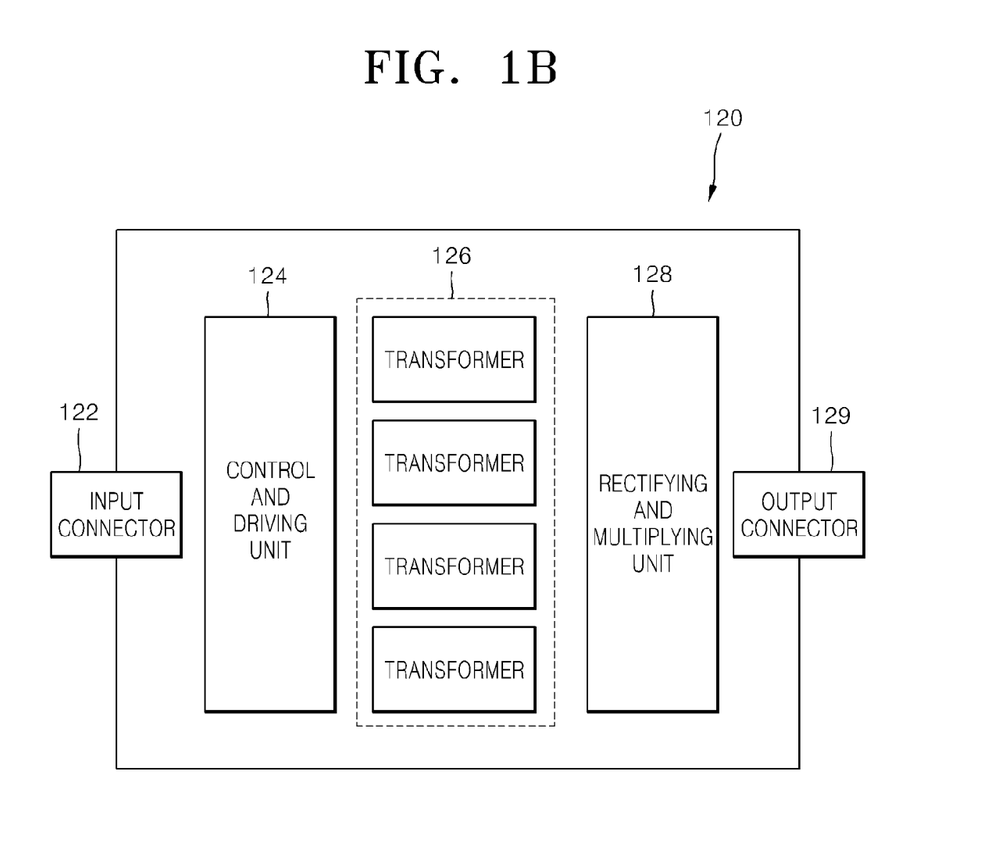
FIG. 1B is a block diagram illustrating a multi-channel output module of the conventional HVPS of FIG. 1A.

FIG. 1A is a block diagram illustrating a conventional high voltage power supply (HVPS). An HVPS board 100 includes an input unit 110, a multi-channel output module 120, and an output unit 130. FIG. 1B is a block diagram illustrating the multi-channel output module 120 illustrated in FIG. 1A. The multi-channel output module 120 includes an input connector 122, a control and driving unit 124, a transforming unit 126, a rectifying and multiplying unit 128, and an output connector 129.

Referring to FIG. 1B, the HVPS board 100 is configured such that the multi-channel output module 120 includes both the control and driving unit 124, which is a circuit connected to a first side of the transforming unit 126, and the rectifying and multiplying unit 128, which is a circuit connected to a second side of the transforming unit 126. As a result, all parts of the conventional HVPS are molded and provided on one HVPS board 100. Accordingly, since the circuit connected to the first side of the transforming unit 126 and the circuit connected to the second side of the transforming unit 126 are integrated, it is difficult to separately design, for example, only the circuit connected to the second side of the transforming unit 126, and also difficult to freely select a distance and a contact method between the circuit connected to the first side and the circuit connected to the second side.

Further, when the entire HVPS board 100 of the conventional HVPS is molded, an end of a controller and a variable resistor are molded as well, making it difficult to finely adjust an output voltage and increasing costs due to an increase in the amount of used molding material.

SUMMARY

The present general inventive concept provides a modular control and driving device of a high voltage power supply (HVPS) which is configured such that a circuit connected to a first side of a transforming unit of the HVPS is modular.

The present general inventive concept also provides an image forming apparatus including the modular control and driving device.

The present general inventive concept also provides an HVPS to be used with the image forming apparatus including the modular control and driving device.

The present general inventive concept also provides an electronic device including the HVPS to be used with the image forming apparatus.

Additional features and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a control and driving device of a high voltage power supply (HVPS) for an image forming apparatus, the control and driving device, which controls and drives a transformer and a rectifying and multiplying unit, including a control and driving circuit unit connected to a first side of the transformer and including a low-pass filter (LPF) that low-pass filters a pulse width modulation (PWM) signal and a switching control unit that amplifies the low-pass filtered signal, generates a high frequency switching signal by receiving the amplified signal as a driving voltage, outputs the high frequency switching signal to a coil connected to the first side of the transformer, and controls a high voltage output by receiving the high voltage output that is fed back; an input connecting unit to connect an external input of the HVPS with the control and driving circuit unit connected to the first side of the transformer; and an output connecting unit to connect an output of the control and driving circuit unit connected to the first side of the transformer with an input of the coil connected to the first side of the transformer, wherein the control and driving circuit unit, the input connecting unit, and the output connecting unit are integrated into one module.

The foregoing and/or other aspects and utilities of the present general inventive concept may also be achieved by providing an HVPS for an image forming apparatus, the HVPS including a control and driving module including a control and driving circuit connected to a first side of a transformer and including an LPF that low-pass filters a PWM signal and a switching control unit that amplifies the low-pass filtered signal, generates a high frequency switching signal by receiving the amplified signal as a driving voltage, outputs the high frequency switching signal to a coil connected to the first side of the transformer, and controls a high voltage output by receiving the high voltage output that is fed back; an input connecting unit to connect an external input of the HVPS with the control and driving circuit unit connected to the first side of the transformer; and an output connecting unit to connect an output of the control and driving circuit unit connected to the first side of the transformer with an input of a coil connected to the first side of the transformer, wherein the control and driving circuit unit, the input connecting unit, and the output connecting unit are integrated into one module; the transformer transforming a switching signal output from the control and driving module into a high voltage signal; and a rectifying and multiplying unit rectifying and multiplying the high voltage signal output from a second side of the transformer and outputting a direct current (DC) high voltage of the HVPS.

The foregoing and/or other aspects and utilities of the present general inventive concept may also be achieved by providing an image forming apparatus comprising the control and driving device of the HVPS and controlling and driving the HVPS by using the control and driving device.

The foregoing and/or other aspects and utilities of the present general inventive concept may also be achieved by providing an electronic device comprising the HVPS and using the HVPS as a power supply unit.

The foregoing and/or other aspects and utilities of the present general inventive concept may also be achieved by providing a control and driving device of an HVPS of an electronic apparatus including an input to receive a signal supplied to the HVPS, a control and driving circuit to control and drive the signal received at the input, and an output to output the controlled and driven signal to a transformer of the HVPS, wherein the input, control and driving circuit, and output are integrated into one physical module.

The control and driving device may further include a switching control unit to amplify the signal received at the input, generate a high frequency switching signal, and output the high frequency switching signal to the transformer.

The switching control unit may receive a high voltage feedback from the transformer, and control the high frequency switching signal according to the high voltage output feedback.

The control and driving device may further include a low-pass filter to low-pass filter a pulse width modulation signal received at the input.

The foregoing and/or other aspects and utilities of the present general inventive concept may also be achieved by providing an HVPS including a control and driving circuit to receive a signal input to the HVPS and output a high frequency switching signal to be transformed by the HVPS, wherein the control and driving circuit is formed in a detachable module.

The foregoing and/or other aspects and utilities of the present general inventive concept may also be achieved by providing a control and driving circuit to be used in an HVPS including a switching control circuit to generate a high frequency switching signal to be transformed by the HVPS, wherein the control and driving circuit is formed in a detachable module configured to be attached to a plurality of types of the HVPS.

The control and driving circuit may further include a low-pass filter to low-pass filter a signal received by the HVPS and supply the low-pass filtered signal to the switching control circuit.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
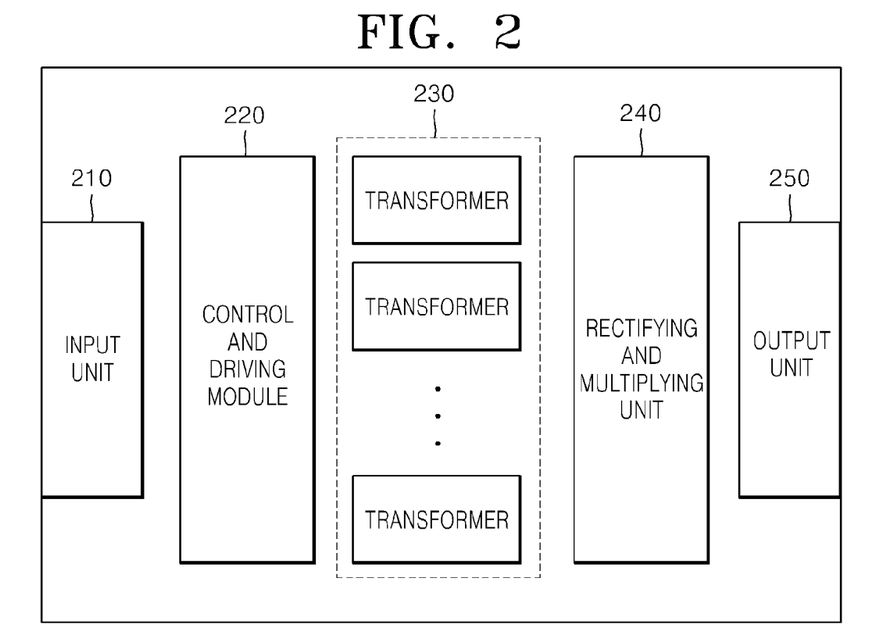
FIG. 2 is a block diagram illustrating an HVPS of an image forming apparatus including a modular control and driving device, according to an embodiment of the present general inventive concept.

FIG. 2 is a block diagram illustrating a high voltage power supply (HVPS) of an image forming apparatus including a modular control and driving device, according to an embodiment of the present general inventive concept. The HVPS may include a control and driving module 220, a transforming unit 230, and a rectifying and multiplying unit 240. The control and driving module 220 is a module that may be connected to a first side of the transforming unit 230 to drive and control the transforming unit 230 and the rectifying and multiplying unit 240.

Figure 3:
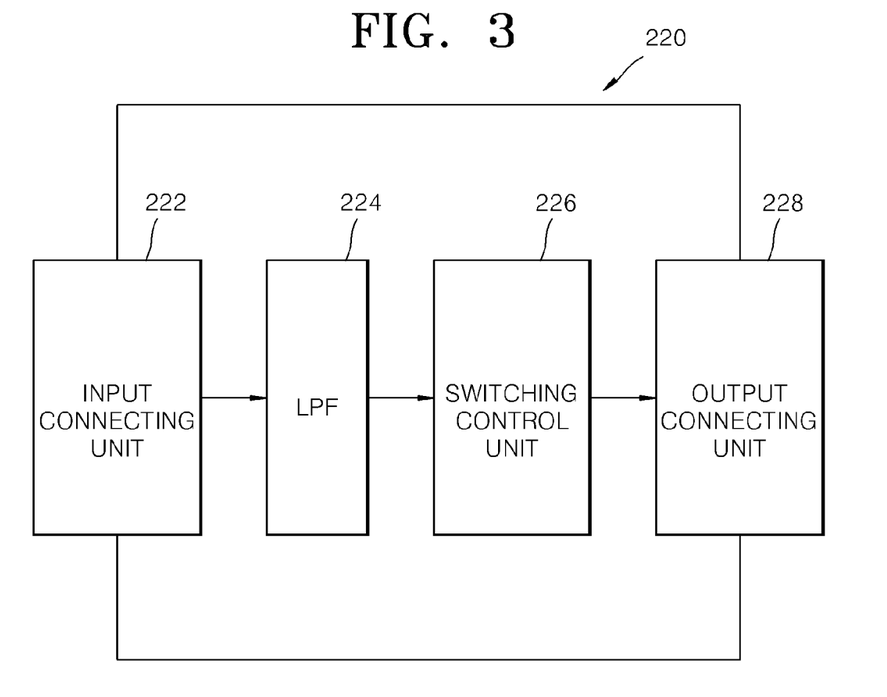
FIG. 3 is a block diagram illustrating a control and driving module of the HVPS of FIG. 2.

FIG. 3 is a block diagram illustrating the control and driving module 220 of the HVPS of FIG. 2. The control and driving module 220 includes an input connecting unit 222, a low-pass filter (LPF) 224, a switching control unit 226, and an output connecting unit 228.

The LPF 224 may low-pass filter a pulse width modulation (PWM) signal to output a signal containing a smooth direct current (DC) component which may include a ripple effect.

The switching control unit 226 may amplify the low-pass filtered signal, generate a high frequency switching signal by receiving the amplified signal as a driving voltage, and output the high frequency switching signal to a coil connected to a first side of the transforming unit 230. If a high voltage output is fed back, the switching control unit 228 may receive the high voltage output and control the high frequency switching signal so that the level of the high voltage output is kept substantially constant.

The input connecting unit 222 may connect a signal input from the input unit 210 of the HVPS with the LPF 224 of the control and driving module 220 that is connected to the first side of the transforming unit 230, and may be any of several types of typical connectors. The output connecting unit 228 may connect an output of the switching control unit 226 of the control and driving module 220 that is connected to the first side of the transforming unit 230 with an input of the coil that is connected to the first side of the transforming unit 230, and may be any of several types of typical connectors.

The transforming unit 230 may transform a switching signal output from the control and driving module 220 into a high voltage signal.

The rectifying and multiplying unit 240 may rectify and multiply the high voltage signal output from a second side of the transforming unit 230, and output a DC high voltage of the HVPS of the image forming apparatus through the output unit 250.

The control and driving module 220 may be fabricated, e.g., molded, such that all parts of the control and driving module 220 are insulated and abnormal current flow between the parts is prevented.

Figure 6:
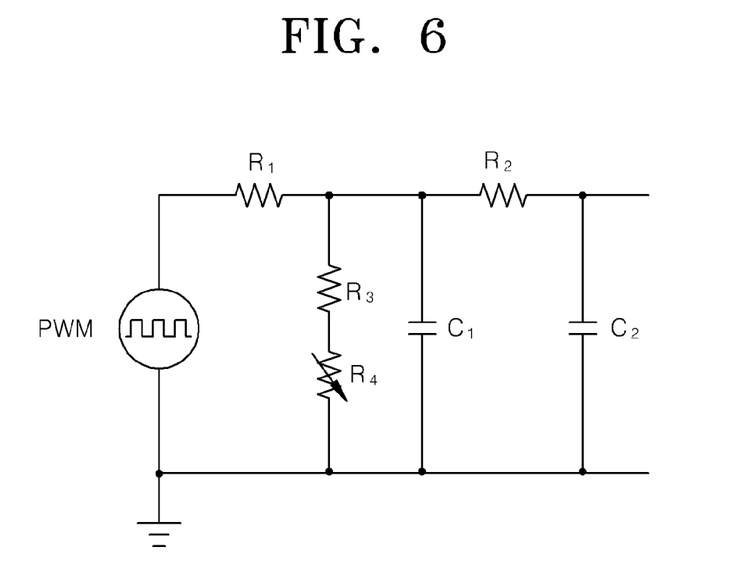
FIG. 6 is a circuit diagram illustrating an LPF according to an embodiment of the present general inventive concept.

The LPF 224 may include, for example, a plurality of resistors $R_1$, $R_2$, and $R_3$, a plurality of capacitors $C_1$ and $C_2$, and one variable resistor $R_4$ as illustrated in FIG. 6. In this example configuration, a voltage output from the second side of the transforming unit 230 may be finely adjusted by molding all of the elements of the control and driving module 220 other than the variable resistor $R_4$ and adjusting the resistance value of the variable resistor $R_4$ that is not molded.

Figure 4:
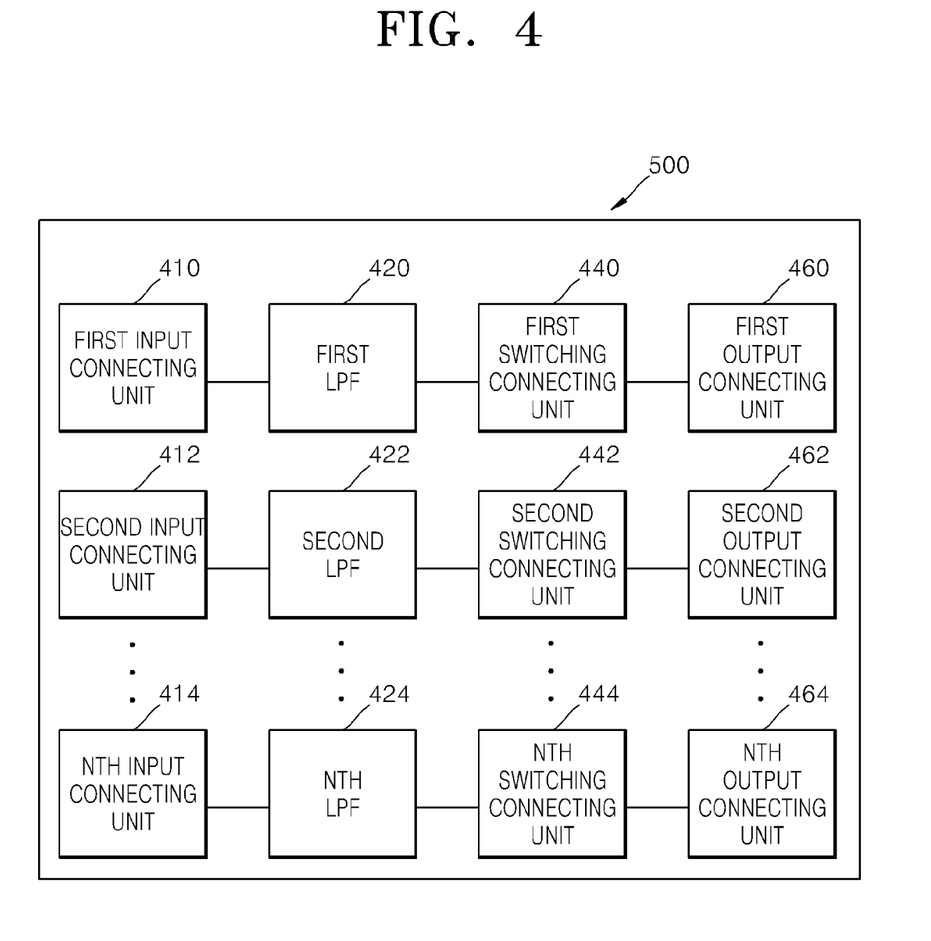
FIG. 4 is a block diagram illustrating a modification of the control and driving module of FIG. 3 which is configured such that a plurality of input connecting units, a plurality of low-pass filters (LPFs), a plurality of switching control units, and a plurality of output connecting units are integrated into one module.
Figure 5:
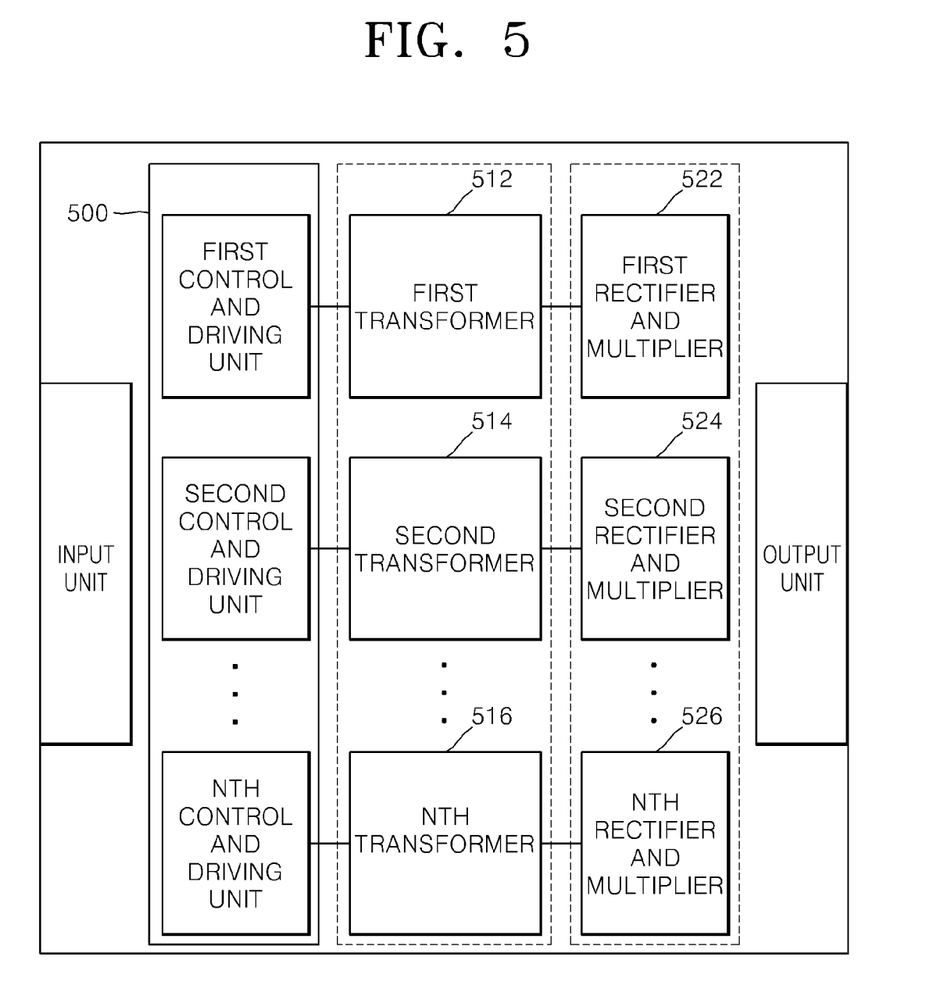
FIG. 5 is a block diagram illustrating an HVPS including the control and driving module of FIG. 4, which is configured such that the control and driving module, and a plurality of transformers and a plurality of rectifiers and multipliers corresponding to the control and driving module, are provided on one board.

FIG. 4 is a block diagram illustrating a modification of the control and driving module of FIG. 3 which is configured such that a plurality of input connecting units, a plurality of low-pass filters (LPFs), a plurality of switching control units, and a plurality of output connecting units are integrated into one module. FIG. 5 is a block diagram illustrating an HVPS including the control and driving module of FIG. 4, which is configured such that the control and driving module, and a plurality of transformers and a plurality of rectifiers and multipliers corresponding to the control and driving module, are provided on one board.

The control and driving module 220 may be modified to a control and driving module 500 as illustrated in FIG. 4 which is configured such that a plurality of input connecting units 410, 412, . . . 414, a plurality of LPFs 420, 422, . . . 424, a plurality of switching control units 440, 442, . . . 444, and a plurality of output connecting units 460, 462, . . . 464 are integrated into one module. An HVPS including the control and driving module 500 of FIG. 4 may be configured such that the control and driving module 500, and a plurality of transformers 512, 514, . . . 516 and a plurality of rectifiers and multipliers 522, 524, . . . 526 corresponding to the control and driving module 500 may be provided on one board as illustrated in FIG. 5.

An image forming apparatus according to an embodiment of the present general inventive concept includes the control and driving device of the HVPS, and controls and drives the HVPS by using the control and driving device. That is, the image forming apparatus according to the present general inventive concept may be any image forming apparatus that can use the control and driving device of the HVPS.

An electronic device according to an embodiment of the present general inventive concept includes the HVPS, and may use the HVPS as a power supply unit. That is, the electronic device according to the present general inventive concept may be any electronic device that can use the HVPS as a power supply unit. Some examples of such an electronic device may include the aforesaid image forming apparatus, a microwave oven, a television, any of various display apparatuses such as a liquid crystal display (LCD) or a plasma display panel (PDP), an electric heater, a home electronic product, etc.

As described above, the amount of required molding material can be reduced by installing a control and driving unit, which is connected to a first side of a transforming unit of an HVPS, as a module to standardize the components to be connected to the first side. An output voltage can be finely adjusted by not molding a variable resistor, unlike in a conventional method. Costs can be further reduced by not molding the module connected to the first side if desired.

A circuit connected to a second side of the transforming unit can be freely designed and a distance and a contact method between the circuit connected to the second side and a circuit connected to the first side can be freely selected by installing the control and driving unit connected to the first side of the transforming unit as the module. Since the control and driving unit is the module, the control and driving unit can be used in a plurality of models, like a custom integrated circuit (IC), irrespective of different shapes and output specifications of various printed circuit boards (PCBs).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A control and driving device of a high voltage power supply (HVPS) of an image forming apparatus, the control and driving device, which controls and drives a transformer and a rectifying and multiplying unit, comprising:
   a control and driving circuit unit connected to a first side of the transformer and comprising:
     a low-pass filter (LPF) that low-pass filters a pulse width modulation (PWM) signal, and
     a switching control unit that amplifies the low-pass filtered signal, generates a high frequency switching signal by receiving the amplified signal as a driving voltage, outputs the high frequency switching signal to a coil connected to the first side of the transformer, and controls a high voltage output by receiving the high voltage output that is fed back;
   an input connecting unit to connect an external input of the HVPS with the control and driving circuit unit connected to the first side of the transformer; and
   an output connecting unit to connect an output of the control and driving circuit unit connected to the first side of the transformer with an input of the coil connected to the first side of the transformer,
   wherein components including the control and driving circuit unit, the input connecting unit, and the output connecting unit are integrated into one module board which is separate from the transformer, the module board being standardized for the components to be connected to the first side of the transformer to operate with different types of circuits to be connected to a second side of the transformer.

2. The control and driving device of claim 1, wherein a plurality of the control and driving circuit units connected to the first side of the transformer, a plurality of the input connecting units, and a plurality of the output connecting units are integrated into the one module.

3. The control and driving device of claim 1, wherein the module is formed such that components of the control and driving device are insulated from one another.

4. The control and driving device of claim 1, further comprising:
   a variable resistor,
   wherein the control and driving module adjusts a voltage output from the second side of the transformer by adjusting a resistance value of the variable resistor.

5. The control and driving device of claim 1, wherein the switching control unit receives the high voltage output and controls the high frequency switching signal to maintain a level of the high voltage output constant if the high voltage output is fed back.

6. The control and driving device of claim 1, wherein the control and driving device is not molded.

7. An image forming apparatus comprising:
   a control and driving device of a high voltage power supply (HVPS) of an image forming apparatus, the control and driving device, which controls and drives a transformer and a rectifying and multiplying unit, comprising:
     a control and driving circuit unit connected to a first side of the transformer and comprising:
       a low-pass filter (LPF) that low-pass filters a pulse width modulation (PWM) signal; and
       a switching control unit that amplifies the low-pass filtered signal, generates a high frequency switching signal by receiving the amplified signal as a driving voltage, outputs the high frequency switching signal to a coil connected to the first side of the transformer, and controls a high voltage output by receiving the high voltage output that is fed back;

an input connecting unit to connect an external input of the HVPS with the control and driving circuit unit connected to the first side of the transformer, and an output connecting unit to connect an output of the control and driving circuit unit connected to the first side of the transformer with an input of the coil connected to the first side of the transformer, wherein components including the control and driving circuit unit, the input connecting unit, and the output connecting unit are integrated into one module board which is separate from the transformer, the module board being standardized for the components to be connected to the first side of the transformer to operate with different types of circuits to be connected to a second side of the transformer.

8. The image forming apparatus of claim 7, wherein a plurality of the control and driving circuit units connected to the first side of the transformer, a plurality of the input connecting units, and a plurality of the output connecting units are integrated into the one module.

9. An HVPS of an image forming apparatus, the HVPS comprising:
a control and driving module comprising:
a control and driving circuit connected to a first side of a transformer and comprising:
an LPF that low-pass filters a PWM signal; and
a switching control unit that amplifies the low-pass filtered signal, generates a high frequency switching signal by receiving the amplified signal as a driving voltage, outputs the high frequency switching signal to a coil connected to the first side of the transformer, and controls a high voltage output by receiving the high voltage output that is fed back;
an input connecting unit to connect an external input of the HVPS with the control and driving circuit unit connected to the first side of the transformer; and
an output connecting unit to connect an output of the control and driving circuit unit connected to the first side of the transformer with an input of a coil connected to the first side of the transformer, wherein components including the control and driving circuit unit, the input connecting unit, and the output connecting unit are integrated into one module board which is separate from the transformer, the module board being standardized for the components to be connected to the first side of the transformer to operate with different types of circuits to be connected to a second side of the transformer;
wherein the transformer transforms a switching signal output from the control and driving module into a high voltage signal; and
a rectifying and multiplying unit rectifies and multiplies the high voltage signal output from the second side of the transformer and outputs a direct current (DC) high voltage of the HVPS.

10. The HVPS of claim 9, wherein the control and driving module is formed such that components of the control and driving module are insulated from one another.

11. The HVPS of claim 10, wherein, when the LPF includes a resistor, a capacitor, and a variable resistor, the control and driving module finely adjusts a voltage output from the second side of the transformer by molding elements other than the variable resistor and adjusting the resistance value of the variable resistor that is not molded.

12. An electronic device comprising:
an HVPS comprising:
a control and driving module comprising:
a control and driving circuit connected to a first side of a transformer and comprising:
an LPF that low-pass filters a PWM signal; and
a switching control unit that amplifies the low-pass filtered signal, generates a high frequency switching signal by receiving the amplified signal as a driving voltage, outputs the high frequency switching signal to a coil connected to the first side of the transformer, and controls a high voltage output by receiving the high voltage output that is fed back;
an input connecting unit to connect an external input of the HVPS with the control and driving circuit unit connected to the first side of the transformer; and
an output connecting unit to connect an output of the control and driving circuit unit connected to the first side of the transformer with an input of a coil connected to the first side of the transformer, wherein components including the control and driving circuit unit, the input connecting unit, and the output connecting unit are integrated into one module board which is separate from the transformer, the module board being standardized for the components to be connected to the first side of the transformer to operate with different types of circuits to be connected to a second side of the transformer,
wherein the transformer transforms a switching signal output from the control and driving module into a high voltage signal; and
a rectifying and multiplying unit rectifies and multiplies the high voltage signal output from the second side of the transformer and outputs a direct current (DC) high voltage of the HVPS.

13. The HVPS of claim 12, wherein the control and driving module is formed such that components of the control and driving module are insulated from one another.

14. The HVPS of claim 13, wherein, when the LPF includes a resistor, a capacitor, and a variable resistor, the control and driving module finely adjusts a voltage output from the second side of the transformer by molding elements other than the variable resistor and adjusting the resistance value of the variable resistor that is not molded.

15. A control and driving device of a high voltage power supply (HVPS) of an electronic apparatus, comprising:
an input to receive a signal supplied to the HVPS;
a control and driving circuit to control and drive the signal received at the input; and
an output to output the controlled and driven signal to a transformer of the HVPS;
wherein components including the input, the control and driving circuit, and the output are integrated into one physical module separate from the transformer, the module being configured to operate with a plurality of types of the HVPS.

16. The control and driving device of claim 15, wherein the control and driving circuit comprises:
a switching control unit to amplify the signal received at the input, generate a high frequency switching signal, and output the high frequency switching signal to the transformer.

17. The control and driving device of claim 16, wherein the switching control unit receives a high voltage output feedback from the transformer, and controls the high frequency switching signal according to the high voltage output feedback.

18. The control and driving device of claim 15, further comprising:
   a low-pass filter to low-pass filter a pulse width modulation signal received at the input.

19. A high voltage power supply (HVPS), comprising:
   a control and driving circuit to receive a signal input to the HVPS and output a high frequency switching signal to be transformed by the HVPS, the control and driving circuit being formed in a separate module that is configured to operate with a plurality of types of the HVPS.

20. A control and driving circuit to be used in a high voltage power supply (HVPS), comprising:
   a switching control circuit to generate a high frequency switching signal to be transformed by the HVPS;
   wherein the control and driving circuit is formed in a separate module configured to be operate with a plurality of types of the HVPS.

21. The control and driving circuit of claim 20, further comprising:
   a low-pass filter to low-pass filter a signal received by the HVPS and supply the low-pass filtered signal to the switching control circuit.

* * * * *